United States Patent [19]

Schmidt et al.

[11] Patent Number: 4,793,795
[45] Date of Patent: Dec. 27, 1988

[54] INJECTION MOLDING SYSTEM HAVING CLAMPED ROTATABLE NOZZLES AND METHOD

[75] Inventors: Harald H. Schmidt; Jobst U. Gellert, both of Georgetown; Rory McDowall, Acton, all of Canada

[73] Assignee: Mold-Masters Limited, Georgetown, Canada

[21] Appl. No.: 130,205

[22] Filed: Dec. 7, 1987

[30] Foreign Application Priority Data

Oct. 16, 1987 [CA] Canada ................................... 549516

[51] Int. Cl.⁴ ............................................. B29C 45/22
[52] U.S. Cl. ................................. 425/549; 264/328.9; 264/328.15; 425/564; 425/566; 425/570; 425/573
[58] Field of Search ............. 264/328.9, 328.8, 328.15; 425/562, 564, 566, 571, 549, 570, 572, 573

[56] References Cited

U.S. PATENT DOCUMENTS

| 4,422,841 | 12/1983 | Alfonsi et al. | 425/549 |
| 4,530,654 | 7/1985 | Rose | 425/548 |
| 4,688,622 | 8/1987 | Gellert | 164/80 |
| 4,702,689 | 10/1987 | Schmidt et al. | 425/564 |

Primary Examiner—Jay H. Woo
Assistant Examiner—Timothy W. Heitbrink
Attorney, Agent, or Firm—Riches, McKenzie & Herbert

[57] ABSTRACT

This invention relates to a valve gated injection molding system in which a number of melt conveying nozzles leading to a common cavity are releasably clamped to the side surface of an elongated manifold. A cylindrical collar around the inlet to each nozzle is received in a recessed seat around each outlet from the manifold. This structure facilitates assembly and ensures alignment of the inlets and outlets, while permitting for some rotational movement between the nozzles and the manifold due to thermal expansion. The integral nozzles are made by vacuum casting a heating element and vacuum brazing a side member with a sidewards projecting face into a steel main body.

4 Claims, 8 Drawing Sheets

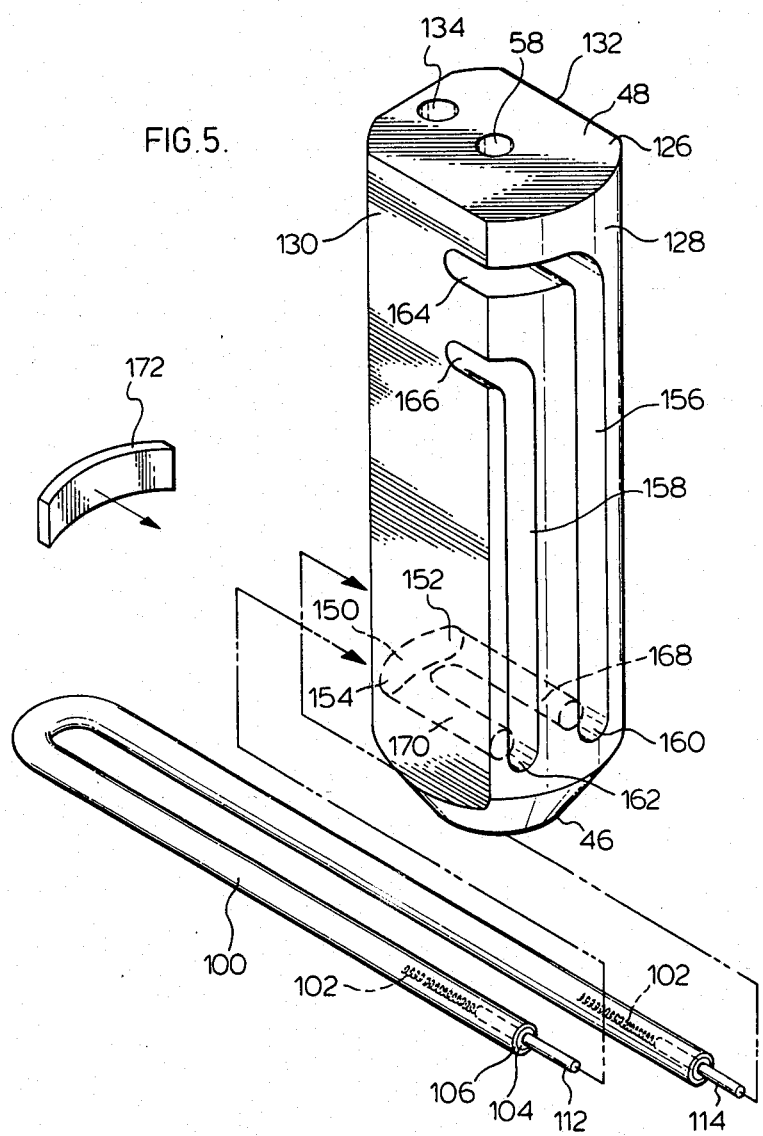

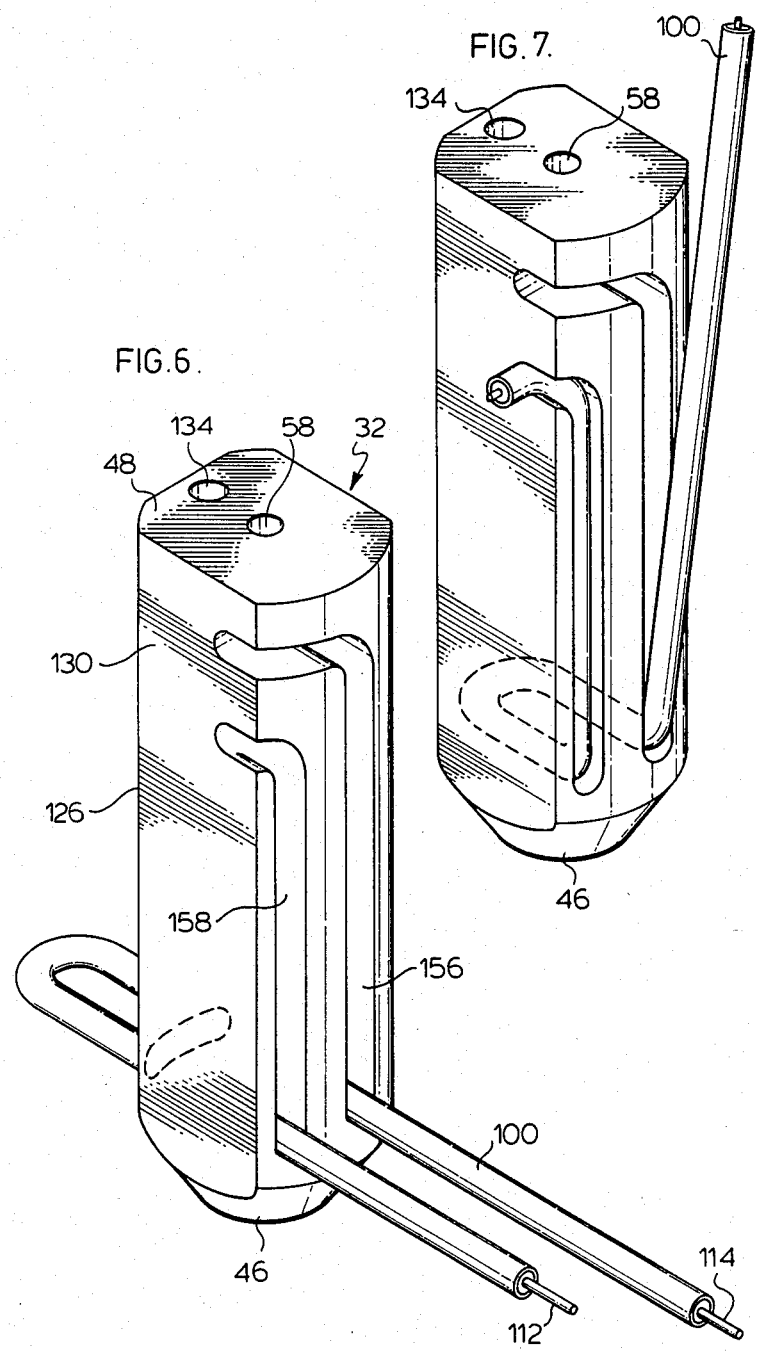

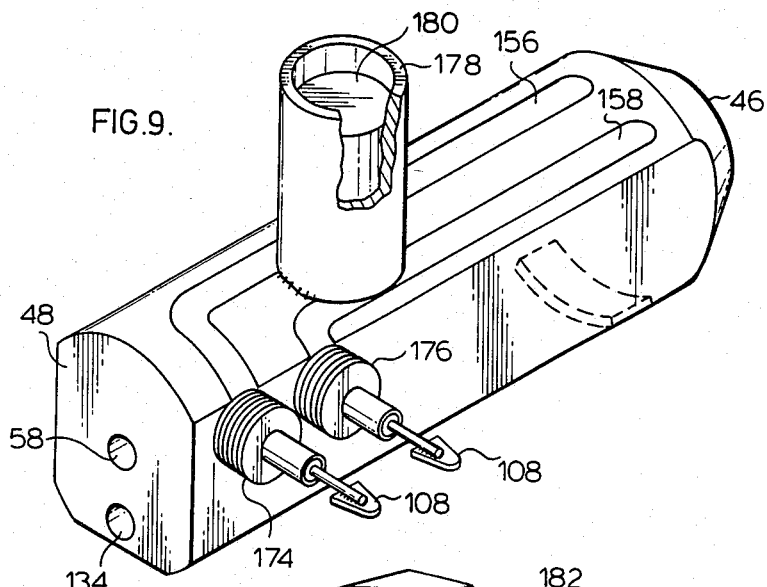
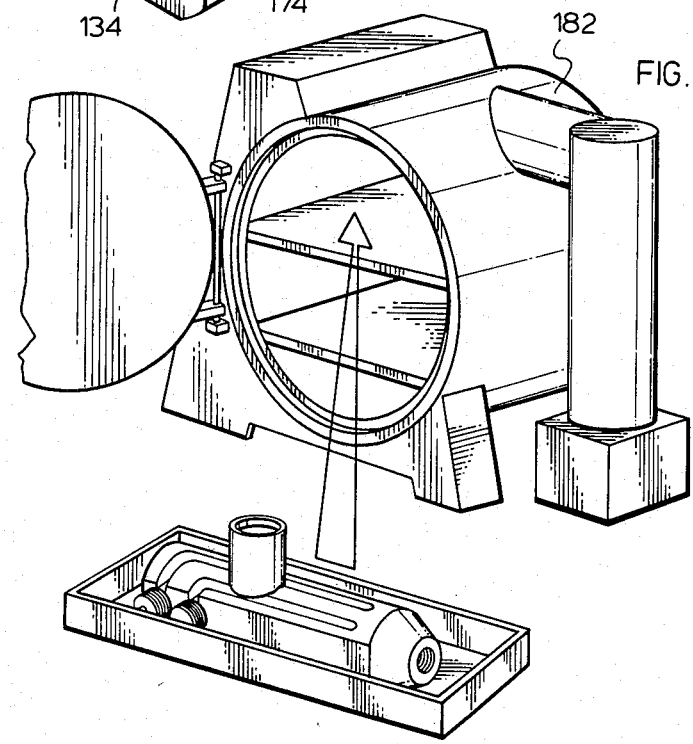

INJECTION MOLDING SYSTEM HAVING CLAMPED ROTATABLE NOZZLES AND METHOD

BACKGROUND OF THE INVENTION

This invention relates generally to injection molding and more particularly to a system in which several heated nozzles are releasably mounted on the side of an elongated manifold to inject melt through spaced gates to a common cavity, and a method of manufacturing the nozzles.

Injection molding is being used to make larger and larger components, particularly in the automotive industry. In addition to considerably increasing the size of the melt channel, this has led to the use of systems in which several nozzles extend from an elongated manifold through separate gates to a single cavity. These applications normally necessitate very high injection pressure up to 30–40,000 psi. and require very large molds which are difficult to machine with accuracy. In the past, the nozzles have been mounted along the forward face of an elongated manifold with sealing provided by each nozzle being in bearing contact against a shoulder in the mold cavity plate. However, in view of the large mold size and high melt pressure, it has been found to be very difficult to machine to the necessary tolerances to provide reliable sealing. Also in the past valve gated systems, as shown for instance in the applicant's U.S. Pat. No. 4,530,654 entitled "Injection Molding Peripheral Opening Core Ring Gate" which issued July 23, 1985, the melt flows through each nozzle in a channel around the valve pin. However, for the present high volume, high pressure applications it has been found to be more efficient to use a separate melt flow channel offset from the central valve pin bore.

Frequently, these large elongated cavities are non-linear and it is desirable to mount the nozzles in different positions relative to each other to connect to the manifold. The applicant's Canadian patent application Ser. No. 524,208 filed Dec. 1, 1986 entitled "Side Mounted Manifold Block for Variable Orientation of Injection Molding Nozzle" provided one solution to this problem using "manifold blocks". The applicant's Canadian patent application Ser. No. 529,897 filed Feb. 17, 1987 entitled "Injection Molding System Having Manifold with Side Mounted Nozzles and Method" discloses another solution to the problem in which each nozzle is bolted directly to the side surface of the manifold with the bolts allowing slight lateral movement between the manifold and the nozzle to provide for thermal expansion of the manifold. While this is satisfactory for some applications, it is time consuming to bolt each nozzle with a desired orientation and it is difficult to accurately align the inlet to the nozzle with the outlet from the manifold.

As is well known, it is essential to the satisfactory operation of an injection molding system such as this that the nozzles have suitable heat flow characteristics to provide substantially uniform temperatures along the length of the melt flow channel and the critical temperatures necessary in the gate area. While a method of casting a heating element into a manifold is disclosed in the applicant's U.S. Pat. No. 4,688,622 which issued Aug. 25, 1987, it is not directly applicable to nozzles.

SUMMARY OF THE INVENTION

Accordingly, it is an object of the present invention to at least partially overcome the disadvantages of the prior art by providing an injection molding system having a number of nozzles to convey melt to a common cavity wherein each nozzle is clamped in a desired orientation to the side surface of the manifold.

It is a further object of the invention to provide a valve gated side mounted nozzle with an offset melt channel having an integral heating element and a method of making it.

To this end, in one of its aspects, the invention provides a multi-gate injection molding system having a plurality of heated nozzles extending from a common elongated manifold with a side surface, the manifold having a longitudinal melt bore extending from an outlet to a plurality of outlet bores, each outlet bore leading to an outlet on the side surface of the manifold, each nozzle having a forward end and a rear end, each nozzle being located with the forward end seated in a well in a core and having a melt channel extending to a central gate leading to a common cavity, the improvement wherein each nozzle has a side portion with a central face which projects sidewards adjacent the rear end, the melt channel of each nozzle has a lateral portion and a generally longitudinal portion, the lateral portion around a smoothly curved bend to the longitudinal portion, the longitudinal portion leading to the gate adjacent the forward end, and clamping means releasably secure each nozzle to the manifold in a desired orientation with the central face of the side portion of the nozzle abutting against the side surface of the manifold with the melt channel inlet in alignment with a respective one of the outlets from the manifold.

In another of its aspects, the invention provides a method of manufacturing an elongated injection molding nozzle having a main body with a forward and a rear end with a central valve pin bore extending therebetween to receive an elongated valve pin therethrough, an integral heating element, an integral side portion which extends to a face which projects sidewards adjacent the rear end of the main body, and a melt channel with a lateral portion and a generally longitudinal portion, the lateral portion extending from an inlet on the face of the side portion around a smoothly curved bend to the longitudinal portion, the longitudinal portion being offset from the central valve pin bore until they join adjacent the forward end, comprising the steps of forming the elongated main body of tool steel with a forward end, a rear end and a generally cylindrical outer surface, drilling a central valve pin bore from the rear end to a mouth at the forward end of the main body to receive the valve pin therethrough drilling an offset melt channel well from the rear end of the main body having a predetermined diameter to form the longitudinal portion of the melt channel, drilling a radial plug bore adjacent the rear end of the main body, the radial plug bore intersecting both the offset melt channel well and the central valve pin bore, forming an elongated side member of steel with an enlarged portion at one end extending from a cylindrical plug portion at the other end, the enlarged portion having a central face at said one end, the plug portion adapted to be received in the radial plug bore, the plug portion having a diametrical bore therethrough to align with and form a portion of the central valve pin bore when the plug portion is received in the plug bore, the side member also has a melt channel bore which extends from an inlet on the central face to form the lateral portion of the melt channel and bends to extend from one side of the plug portion to join the melt channel well in the main body when the plug portion is received in the plug bore with the diametrical bore aligned with the valve pin bore in the main body, machining a laterally extending heating element groove in the outer surface of the main body, the laterally extending groove having first and second ends and being located adjacent the forward end of the body on the same side as the plug bore, machining two spaced longitudinally extending heating element grooves in the outer surface of the main body, the longitudinally extending grooves each having forward and rear ends and being located opposite the laterally extending groove, drilling a pair of holes laterally through the main body, each hole connecting one end of the laterally extending groove to the forward end of a respective one of the laterally extending grooves, inserting an electric heating element having first and second ends through the lateral holes and bending the heating element to a position in which a portion of the heating element is received in the laterally extending groove and each of the longitudinally extending grooves with each end of the heating element extending from the rear end of a respective one of the longitudinally extending grooves, whereby a continuous space is provided surrounding the heating element in the grooves, securing a sealing plate over the laterally extending heating element groove to prevent substantial leakage from the groove, sealing the grooves around the ends of the heating element projecting from the grooves to prevent substantial leakage from the grooves, fixing a filler tube with an open mouth on the outer surface of the main body in communication with the longitudinally extending grooves, applying brazing material between the plug portion of the side member and the plug bore and inserting the side member into position with the plug portion received in the plug bore and inserting the valve pin into the central valve pin bore to extend through the diametrical bore through the plug portion to accurately locate the side member, inserting a predetermined quantity of a highly conductive material into the filler tube, heating the assembled main body, side body and heating element in a vacuum furnace for a sufficient period of time to and at a temperature to melt the brazing material and the highly conductive material which flows into the continuous space along the heating element and fills the grooves, whereby the side member is integrally brazed to the main body and a metallurgical bond is formed between the heating element and the highly conductive material and between the highly conductive material and the main body, machining off the filler tube and the sealing plate, and drilling diagonally through the mouth of valve pin bore to connect to the longitudinal portion of the melt channel adjacent the forward end.

Further objects and advantages of the invention will appear from the following description, taken together with the accompanying drawings.

BRIEF DESCRIPTION OF THE DRAWINGS

FIGS. 5, 6 and 7 illustrate successive steps in the installation of the heating element in the main body of the nozzle;

FIG. 9 is an isometric view showing the filler tube fixed to the outer surface of the main body of the nozzle; and FIG. 10 shows the assembly heated in a vacuum furnace.

DETAILED DESCRIPTION OF THE DRAWINGS

Figure 1:
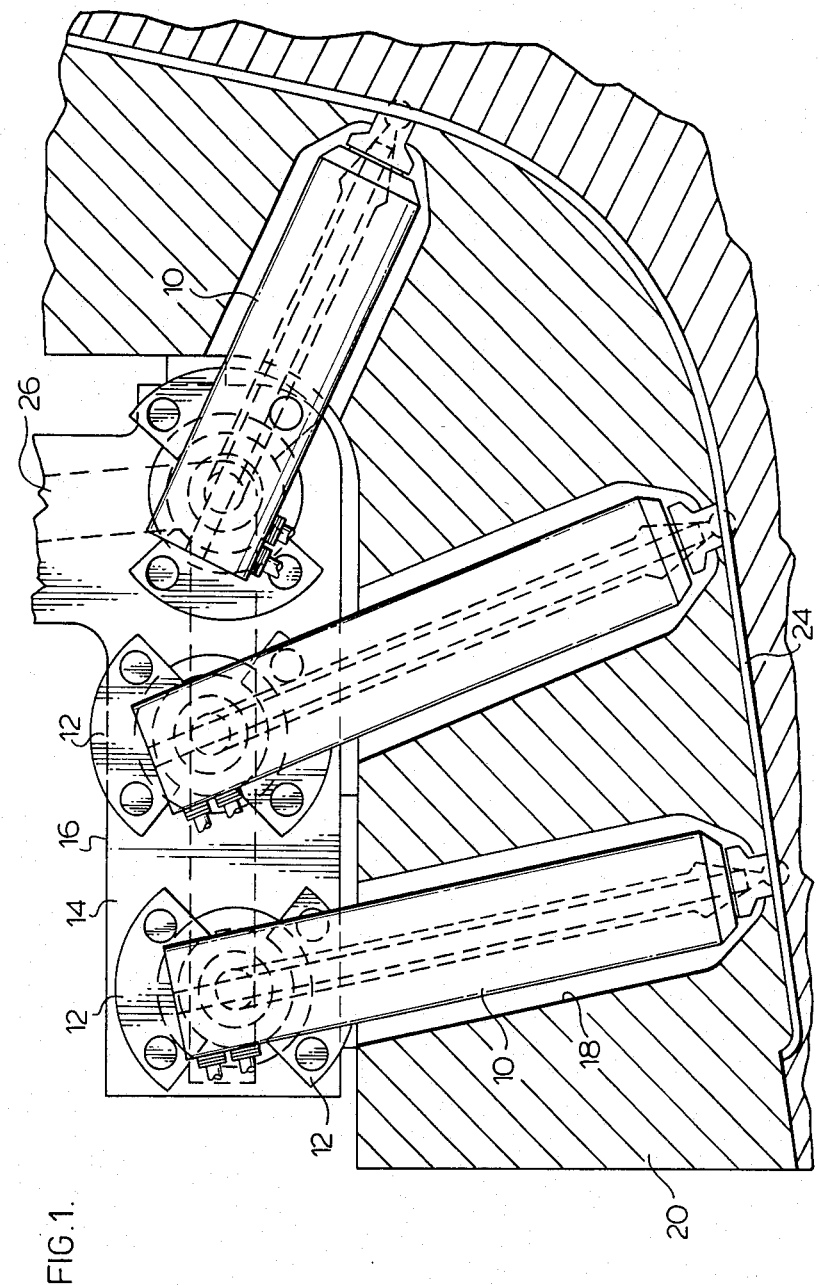
FIG. 1 is an elevation view showing a portion of an injection molding system with several nozzles clamped in various orientations to the side surface of an elongated manifold according to a preferred embodiment of the invention.

Reference is first made to FIG. 1 which shows a portion of a valve gated injection molding system having several heated nozzles 10 secured in different orientations by clamping members 12 to the side surface 4 of an elongated steel manifold 16. The heated nozzles 10 are each seated in a well 18 in a core 20 to convey melt from the manifold 16 to a common non-linear cavity 24.

Figure 2:
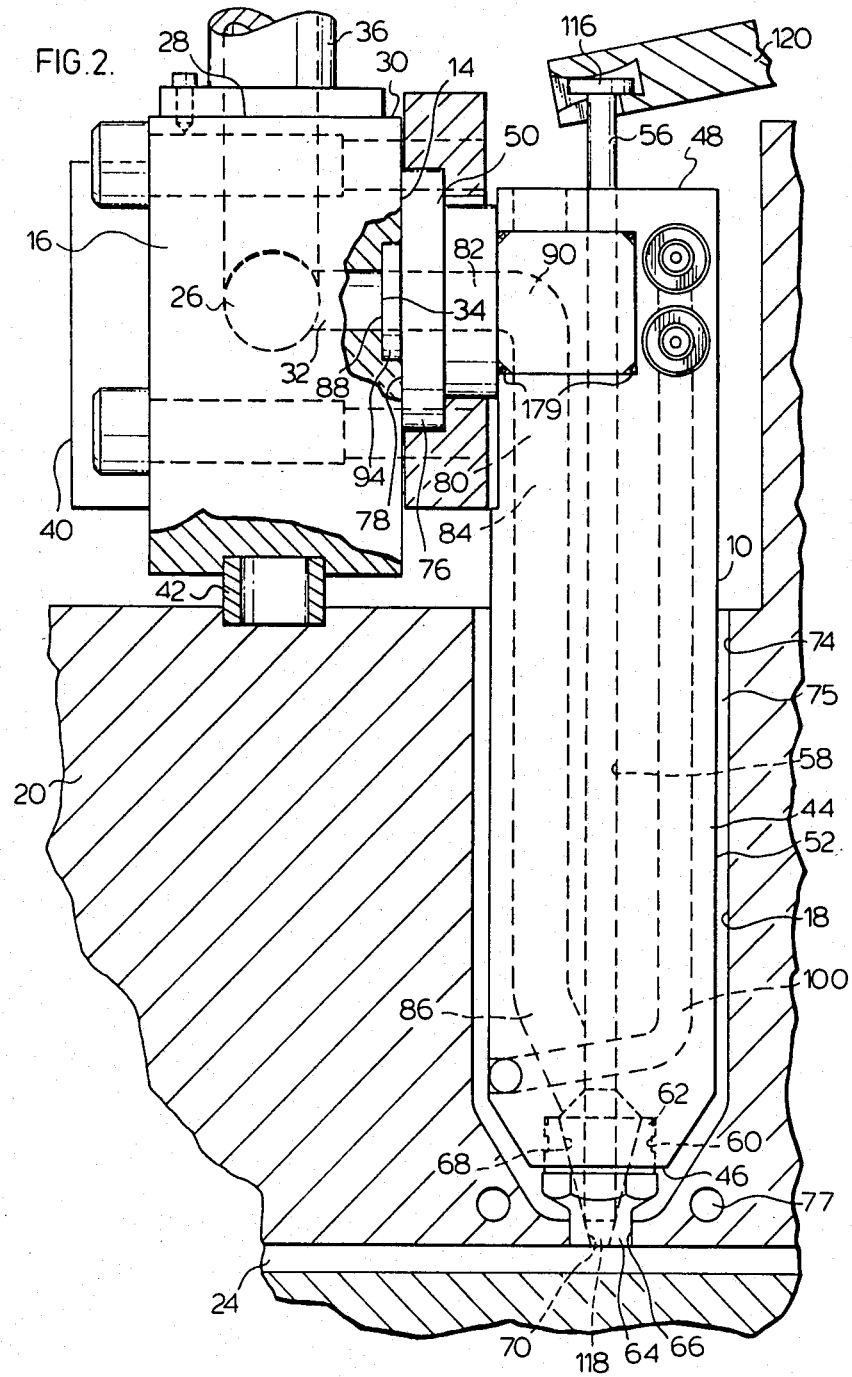
FIG. 2 is a cross section showing one of the nozzles seen in FIG. 1.

As is seen in FIG. 2, the manifold 16 has a longitudinal melt bore 26 which connects an inlet 28 on the rear surface 30 to a number of outlet bores 32 which branch to spaced outlets 34 on the side surface 14. A heated melt conveying tube 36 is bolted to the rear surface 30 of the manifold 16 to convey pressurized melt from a molding machine (not shown). The manifold 16 is heated by an electric plate heater 40 bolted to the manifold and is located relative to the core 20 by a locating ring 42 seated between them.

Figure 3:
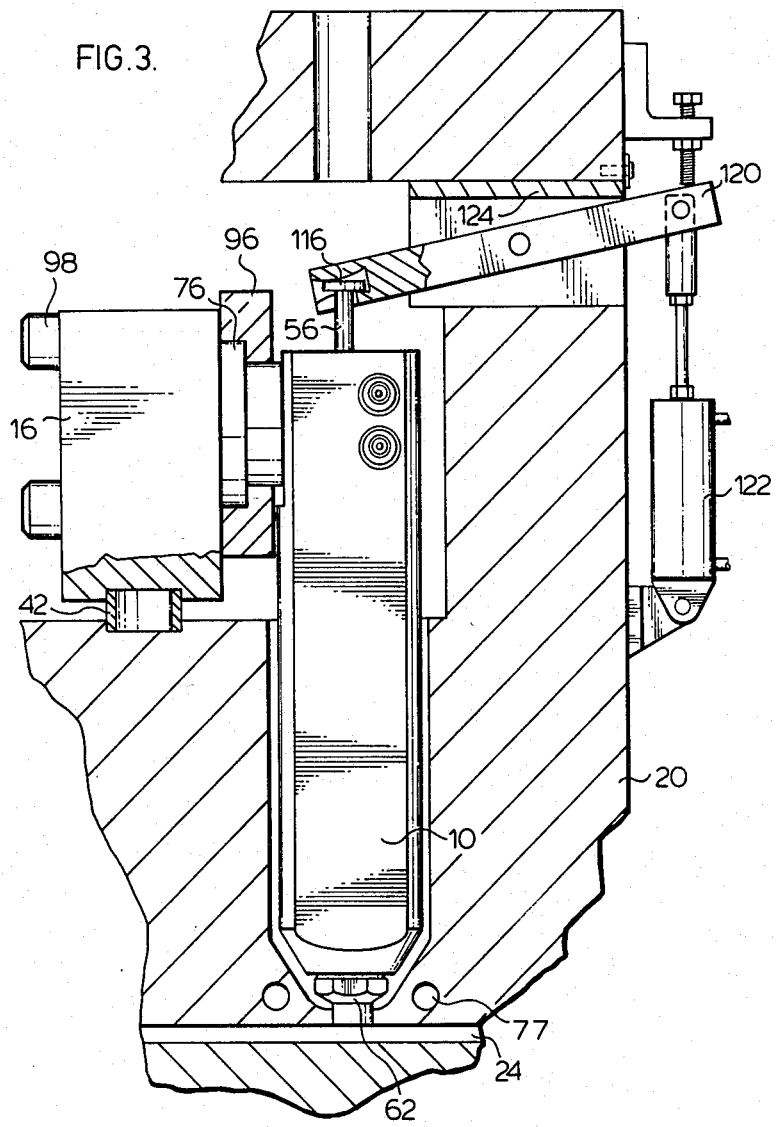
FIG. 3 is a similar view showing the actuating mechanism.

Each nozzle 10 has a main body 44 with a forward end 46 and a rear end 48 and an integral side portion 50 which project sidewards adjacent the rear end 48 of the main body 44. The nozzle 10 has a generally cylindrical outer surface 52, although in this embodiment it has a pair of opposed flat sides (as seen in FIG. 3). An elongated valve pin 56 extends through a central valve pin bore 58. In this embodiment, the valve pin bore 58 has an enlarged mouth 60 which is threaded to securely receive a hollow tip insert 62 at the forward end 46, The steel tip insert 62 has a cylindrical nose portion 64 which is received in an opening 66 through the core 20 and a tapered central bore 68 which is in alignment with the valve pin bore 58. This forms a gate 70 leading to the cavity 24 and accurately locates the nozzle in the well. An insulative air space 75 is provided between the heated nozzle 10 and the inner wall 74 of the well 18 in the surrounding core 20 which is cooled by water flowing through cooling conduits 77.

Figure 4:
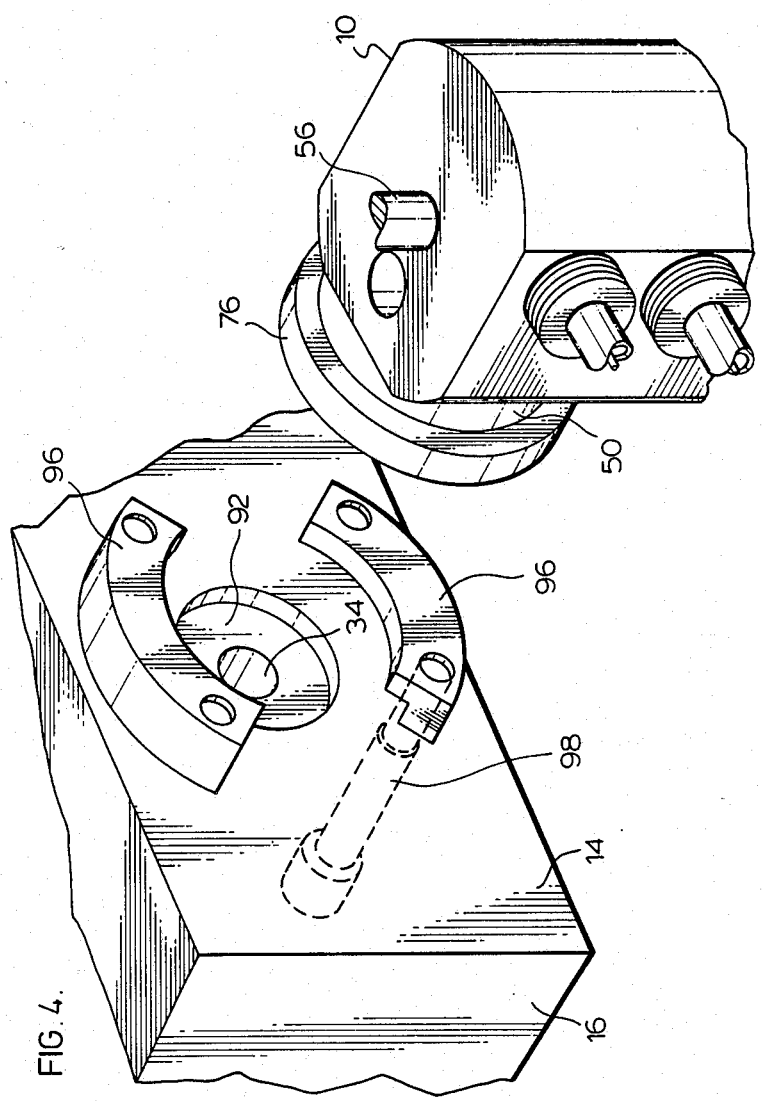
FIG. 4 is a partial isometric view illustrating how each nozzle is clamped to the side surface of the manifold.

The side portion 50 of each nozzle 10 has an outwardly projecting flanged portion 76 which extends circumferentially around a central face 78. The nozzle 10 has a melt channel 80 with a lateral portion 82 and a longitudinal portion 84. As can be seen, the longitudinal portion 84 extends parallel to but offset from the central valve pin bore 58 until a diagonal portion 86 extends to connect it to the mouth 60 of the valve pin bore 58 adjacent the forward end 46. The lateral portion 82 of the melt channel 80 extends from an inlet 88 on the central face 78 of the side portion 50 and connects to the longitudinal portion 84 at a smoothly curved bend 90. In this embodiment, the side surface 14 of the manifold has a recessed cylindrical seat 92 extending around each outlet 34 from the melt bore 26. The side portion 50 of each nozzle 10 has a collar 94 which projects outwardly around the melt channel inlet 88 on the central face 78. The inlets 88 are equal in diameter to the outlets 34, and when the collar 94 of a particular nozzle 10 is received in the recessed seat 92, the respective inlet 88 and outlet 34 are maintained in accurate alignment even if there is some rotational movement between them. FIG. 4 shows a pair of flanged clamping members 96 which are releasably secured by bolts 98 to the side surface 14 of the manifold 16. When the nozzle 10 is mounted with the collar 94 received in the recessed seat 92, the clamping member 96 engage the flanged portion 76. As each nozzle 10 is installed individually, the bolts 98 are tightened sufficiently to hold it in place, but not to prevent it rotating. After all of the nozzles are mounted with their respective orientations, the bolts 98 are all tightened to secure the collar 94 of each nozzle 10 against the recessed seat 92 in the side surface 14 of the manifold to prevent leakage of the melt during use. However, it will be appreciated that this structure will still permit slight rotational movement between each nozzle 10 and the manifold 16 due to thermal expansion, while still retaining the inlet 88 and outlet 34 in accurate alignment.

Each nozzle 10 has an integral electric heating element 100, the installation of which is described in detail below. The 220 volt single wire heating element 100 has a coiled chrome-nickel resistance wire 102 extending through a refractory powder electrical insulating material 104 such as magnesium oxide inside a steel casing 10.. The heating element 100 has an enlarged cold terminal 108 with a larger conductor which is laser welded to the wire 102 at each end 112,114 of the heating element 100. In order to provide additional heat where required along the length of the heating element 100, the pitch of the coils of the resistance wire 102 is varied according to a predetermined pattern.

As mentioned above, an elongated value pin 56 is located in the central valve pin bore 58 of each nozzle 10. Each valve pin has a driven end 116 and a tapered tip end 118. In this embodiment, the driven end is engaged by a rocker arm 120 which is driven by a hydraulically actuated piston 122. The rocker arm 120 is pivotally mounted in a cylindrical housing 124 to provide a removable rocker arm assembly as described in detail in the applicant's Canadian patent application Ser. No. 532,489 filed Mar. 19, 1987 entitled "Replaceable Rocker Arm Assembly for Injection Molding System". Hydraulic fluid applied to the piston 122 according to a predetermined cycle reciprocates the valve pin 56 in the valve pin bore 58 between a forward closed position in which the tip end 118 is seated in the gate 70 and a retracted open position.

In use, after the system has been assembled as described above, electrical power is applied to the plate heater 40 and the heating elements 100 to heat the manifold 16 and the nozzles 10 to a predetermined operating temperature. This increase in temperature causes thermal expansion of the manifold and, as mentioned above, the clamping members 96 and bolts 98 allow the manifold to move laterally relative to the nozzles 10 while the collars 94 seated in the recessed seats 92 keep the inlets 88 and outlets 34 in accurate alignment. Pressurized melt is then introduced into the manifold melt bore 26 by the molding machine (not shown) positioned at the recessed central inlet 38. Melt pressure is controlled according to a predetermined cycle in conjunction with the application of controlled hydraulic pressure to the actuating mechanism, in a conventional manner. With the valve pins 56 in the retracted open position, the melt flows through the gates 70 and fills the cavity 20. After the cavity is full, injection pressure is held momentarily to pack and hydraulic pressure is then applied to drive the valve pins 56 to the forward closed position with the tip end 118 of each valve pin 56 seated in one of the gates 70. The injection pressure is then released and this position is held for a short cooling period before the mold is opened for ejection. After ejection, the mold is closed and hydraulic pressure reapplied to draw the valve pin 56 to the retracted open position. Melt injection pressure is reapplied to refill the cavity, and the molding cycle is repeated continuously in a uniform cycle, depending on the size and shape of the cavity and the type of material being molded.

Reference is now made to FIGS. 5–10 in describing the steps involved in the manufacture of nozzles according to the invention. An elongated main body 126 having the forward end 46 and the rear end 48 is machined of a tool steel such as H13 to have a generally cylindrical outer surface 128, with two flat sides 130,132. The valve pin bore 58 is drilled to extend centrally through the main body 126 from the rear end 48 to the forward end 46. The mouth 60 of the valve pin bore 58 t the forward end is machined to enlarge it and it is threaded to receive the tip insert 62 firmly in place. A well 134 offset from the central valve pin bore 58 is drilled from the rear end 48 of the main body 126 to form the longitudinal portion 84 of the melt channel 80. A diagonal bore 136 is drilled through the mouth 60 of the valve pin bore 58 to connect the well 134 to the mouth 60 of the valve pin bore 58.

Figure 8:
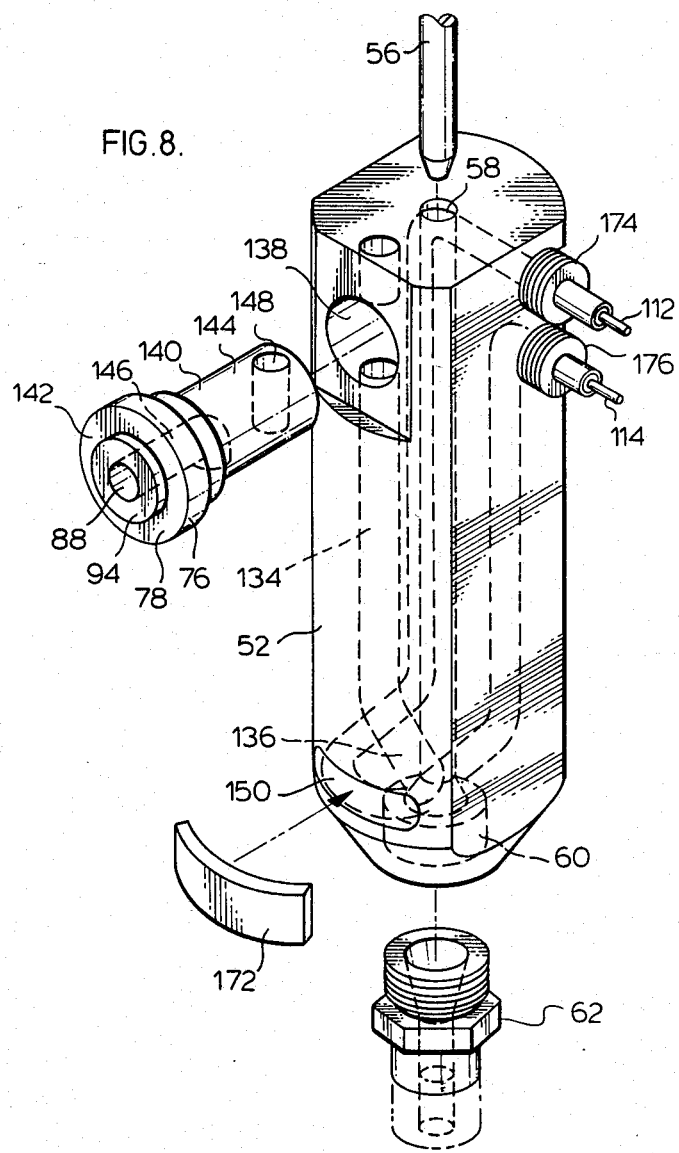
FIG. 8 is an isometric view showing installation of the side member in the main body of the nozzle.

As seen in FIG. 8, a large diameter plug bore 138 is drilled radially adjacent the rear end 48 of the main body 44 to intersect both the offset melt channel well 134 and the central valve pin bore 58. An elongated side member 140 is formed of steel with an enlarged portion 142 at one end an a cylindrical plug portion 144 at the opposite end. The plug portion 144 is made to be snugly received in the plug bore 138, in which position the enlarged portion 142 extends sideways to form the side portion 50 of the nozzle 10. In the embodiment, the side member 140 is made with the enlarged portion having the flanged portion 76 extending around the central face 78. The central face 78 has the raised collar 94 extending around the inlet 88 to a melt channel bore 146 which is drilled in the side member 140. The melt channel bore 146 extends centrally from the inlet 88 on the central face 78 to form the lateral portion 82 of the melt channel 80 and bends to extend to one side of the plug portion 144 to join the melt channel well 134 when the side member 140 is installed in place. As can be seen, the side member 140 also has a bore 148 extending diametrically through the plug portion 144. This diametrical bore 148 is made to align with and form a portion of the central valve pin bore 58 when the plug portion 144 is received in the radial plug bore 138.

As best seen in FIGS. 5, 6 and 7, a laterally extending heating element groove 150 is machined in the outer surface 128 of the main body 126. The lateral groove has opposite ends 152,154 and is located adjacent the forward end 46 of the main body on the same side as the plug bore 138. Two similar shaped longitudinally extending heating element grooves 156,158 are machined in the outer surface 128 on the opposite side of the main body. These longitudinally extending grooves 156,158 each have forward ends 160,162, and in this embodiment curve sideways adjacent the rear end 48 of the main body to terminate at rear ends 164,166 at the flat side 130. A pair of holes 168,170 are drilled laterally through the main body 126 to connect the ends 152,154 of the lateral groove 150 to the forward ends 160,162 of the longitudinal grooves 156,158. The heating element 100 is then inserted through the lateral holes 168,170 and bent into a position in which a portion of the heating element 100 is received in each of the grooves. The grooves 150,156,158 and the holes 168,170 are sufficiently large relative to the diameter of the heating element 100 that the heating element is completely received in the grooves and a continuous space is provided around the heating element in the grooves.

As shown in FIG. 8, a steel sealing plate 172 is welded to the outer surface 128 to cover the lateral heating element groove 150 to prevent leakage. Washers 174,176 are located over the ends 112,114 of the hating element 100 and welded to the casing 106 and to the side 130 of the main body 126 to seal the rear ends 164,166 of the longitudinal grooves 156,158 against leakage. A hollow filler tube 178 is welded in position on the outer surface 128 to be in communication with both of the longitudinal grooves 156,158. Copper wires 179 are located as shown between the plug portion 144 of the side member 140 and the plug bore 138, and the side member 140 is inserted into position with the plug portion 144 received in the plug bore 138. The valve pin 56 is inserted into the central valve pin bore 58 to retain the plug portion in position and accurately locate and align it. As mentioned above, in this position the melt channel bore 146 extending from the side of the plug portion 144 is also aligned with the melt channel well 134 in the main body 126. A slug of copper 180 is placed in the filler tube 178 and the assembly is heated to a temperature of about 2000° F. in a vacuum furnace 182 as described in U.S. Pat. No. 4,648,546 to Gellert entitled "Composite Plate Method of Manufacturing Injection Molding Manifold" which issued Mar. 10, 1987. This results in the copper melting and flowing along the continuous space around the heating element 100 to fill the grooves 150,156,158 and lateral holes 168,170 around the heating element 100. Under the influence of the vacuum in the vacuum furnace, the copper forms an integral metallurgical bond with the steel of the heating element casing 106 and the surrounding main body 126 which facilitates heat transfer and avoids the formation of hot spots along the heating element. The copper wires 179 around the plug portion 144 of the side member 140 similarly melt and flow under capilary action to integrallly braze the side member 140 in place and provide smooth finishes where the melt channel bore 146 and the diametric bore 148 of the side member 140 join the melt channel well 134 and the central valve pin bore 58 of the main body 126. After removal from the vacuum furnace 182, the outer surface 52 of the nozzle 10 is machined to remove the filler tube 178 and the sealing plate 172. In this embodiment of the invention, the tip insert 62 is then screwed into place in the mouth of the valve pin bore 58.

While the description of the system and the method of making the nozzles have been given with respect to preferred embodiments, it is not to be construed in a limiting sense. Variations and modifications will occur to those skilled in the art. For example, clamping members having different configurations may be used, and the succession of the steps in the method may vary. Reference is made to the appended claims for a definition of the invention.

What we claim is:

1. In a multi-gate injection molding system having a plurality of heated nozzles extending from a common elongated manifold with a side surface, the manifold having a longitudinal melt bore extending from an outlet to a plurality of outlet bores, each outlet bore leading to an outlet on the side surface of the manifold, each nozzle having a forward end and a rear end, each nozzle being located with the forward end seated in a well in a core and having a melt channel extending to a central gate leading to a common cavity, the improvement wherein;
    (a) each nozzle has a side portion with a central face which projects sidewards adjacent the rear end,
    (b) the melt channel of each nozzle has a lateral portion and a generally longitudinal portion, the lateral portion around a smoothly curved bend to the longitudinal portion, the longitudinal portion leading to the gate adjacent the forward end, and
    (c) clamping means to rotatably mount each nozzle to the manifold with the central face of the side portion of the nozzle abutting against the side surface of the manifold with the melt channel inlet in alignment with a respective one of the outlets from the manifold, the clamping means being operative to releasably secure the nozzle to the manifold in any desired angular position.

2. An injection molding system as claimed in claim 1 wherein the side portion of each nozzle has a flanged portion extending around the central face and the clamping means comprise clamping members mounted on the manifold to releasably engage the flanged portion of the side portion of each nozzle.

3. An injection molding system as claimed in claim 2 wherein the side surface of the manifold has a recessed circular seat extending around each outlet and the central face of the side portion of each nozzle has a raised collar extending around the inlet to the melt channel, the raised collar of each nozzle being received in a respective one of the circular seats to align the melt bore outlet from the manifold with the inlet to the nozzle melt channel.

4. An injection molding system as claimed in claim 3 wherein the clamping means comprise a pair of flanged clamping members bolted to the manifold on opposite sides of each nozzle to releasably engage the flanged portion of the side portion of the nozzle.

* * * * *